Patented Oct. 18, 1949

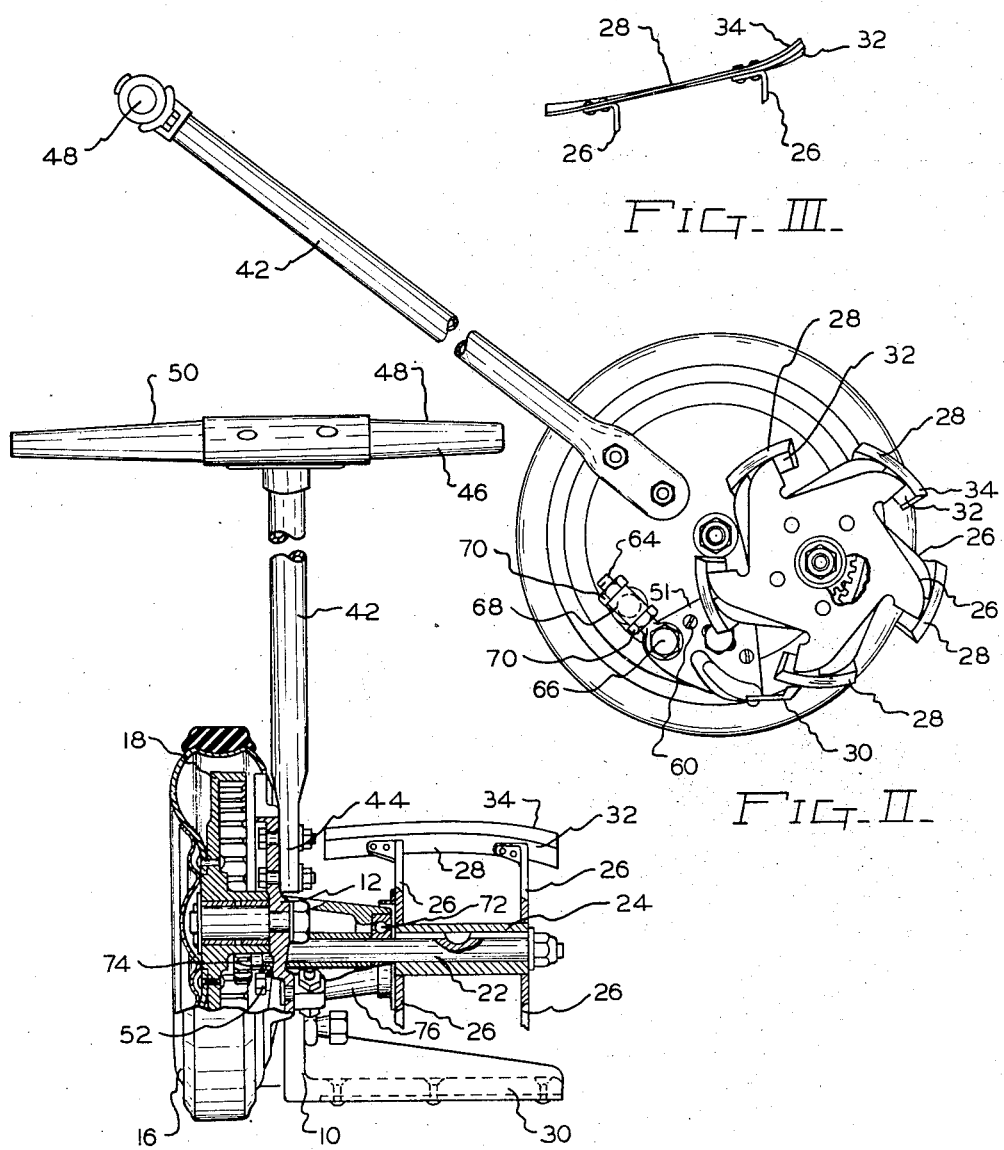

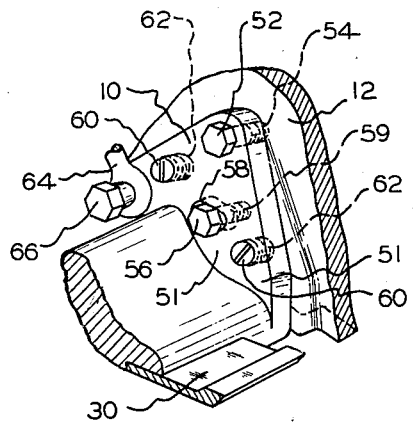
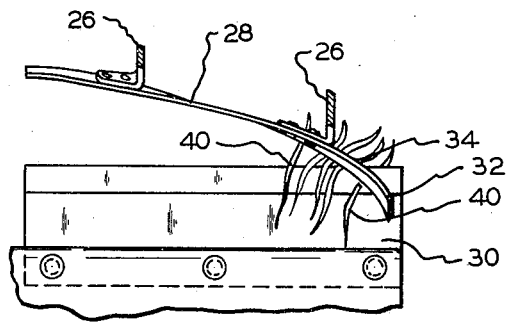
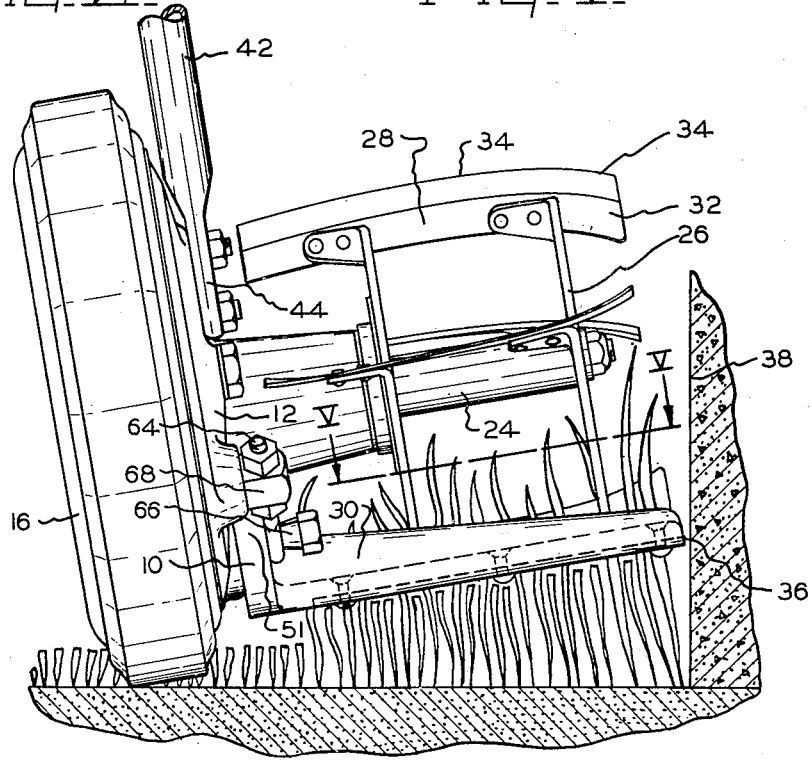

2,484,990

UNITED STATES PATENT OFFICE 2,484,990

GRASS TRIMMER

Truman B. Funk, Jackson, Mich.

Application June 28, 1947, Serial No. 757,819

8 Claims. (Cl. 56—249)

The present invention relates to grass trimmers of the type disclosed in my co-pending application Serial No. 709,804, filed November 14, 1946.

It is an object of the present invention to improve the construction of the reel blade used in grass trimmers of the aforesaid type to enable the cutting of grass directly adjacent walls, buildings, walks, and other structures and obstructions.

Another object of the invention is to provide an improved, open-end grass cutter or trimmer, having a cutting reel made up of twisted spiral blades with portions of the blades adjacent the open ends of the reel of reduced pitch, to draw in and cut grass directly adjacent the open ends of the reel.

A further object is to provide an improvement in adjustment mechanism for an open-ended reel type grass trimmer.

These and other objects and advantages residing in the combination, construction and arrangement of parts will be more fully appreciated from a consideration of the following specification and appended claims.

In the drawings,

Fig. I is a rear view of a grass trimmer, embodying the present invention, and partly shown in broken section, Fig. II is a side elevational view of the grass trimmer taken from the open end of the cutting reel, Fig. III is a plan view of a portion of a reel structure illustrating the reduced pitch of the twisted spiral blades adjacent the open end of the reel, Fig. IV illustrates the mower being used to trim the grass directly adjacent a wall, Fig. V is a view of the reel blade and cutter bar taken on line V—V of Fig. IV, and Fig. VI is an enlarged detail of the adjustment means for the cutter bar.

Referring to the drawings, the grass trimmer 10 may be of the same general construction as disclosed in the aforesaid application, with a frame member 12 in which the stud axle 14 is carried and about which the wheel 16 rotates. An internal gear 18 meshes with the pinion 20 on the shaft 22 to drive the cutting reel 24. Spider members 26 of a well-known construction support the spiral twisted cutting blades 28 in a well-known manner to cut the grass as the blades 28 wipe across the cutter bar 30.

The reel 24 rotates clockwise, as viewed in Fig. II. Preferably, the outer end 32 of each blade 28 has its shearing edge defining portion 34 pronouncedly arcuate or hook-like. This construction is provided in what may be called the open end of the reel, namely, that end of the cutting reel 24 remote from the supporting and drive wheel 16. This construction is such as to hook and carry the blades of grass engaged by the portions 32 into shearing engagement with the cutter bar 30 and avoids the tendency in reels of standard construction for inclined grass directly adjacent the open end of the reel to be forced by the reel away from the cutter bar. Because of the shape of the portion 32 and the direction of rotation of the reel 24, the grass at the outer or open end of the reel is hooked and drawn inwardly and sheared off. Thus it becomes possible to cut the grass directly adjacent the wall or building, as the grass is drawn in toward the center of the reel in lieu of being forced outwardly away from the shearing zone at a point directly adjacent the open end of the reel 24.

It is to be understood that the shearing edge of the blades 28 is disposed in a cylindrical surface having its longitudinal axis common with the axis of rotation of the reel 24 and the shaft 22. Preferably the blades 28 are of uniform twisted spiral configuration except for the portion 32 which may be defined as the leading end of the blades 28 of abrupt reduction in pitch. The shearing edge portion 34 is disposed in the cylindrical surface, aforesaid, as are all other shearing portions of the blades 28.

In Figs. IV and V an attempt is made to illustrate the principles of construction and operation of the invention. The trimmer 10 is shown slightly tilted with the end 36 of the cutter bar 30 directly adjacent the wall 38. It will be noted that the end 36 extends a short distance beyond the reel 24, to protect the reel from engagement with the wall 38. This slight extension of the end 36 is not necessary, however, as the tilting of the trimmer 24, as shown in Fig. IV will avoid any interference between the reel 24 and the wall 38. The hook action of the portions 32 of the blades 28 upon the blades of grass 40 results in the grass being efficiently trimmed directly adjacent the wall 38.

The operating shaft 42 is attached at 44 to the side plate 12. A cross handle 46 at the upper end of the shaft 42 is preferably of unbalanced construction with the hand bar 48 on the side of the reel 24 of lesser length than the hand bar 50. This arrangement provides clearance for the operator's elbow when trimming along a wall. Also the extra length of the bar 50 provides a leverage for supporting the unbalanced weight of the reel.

In the illustrated form, if a comparison is made with that disclosed in my aforesaid application, it will be noted that the reel shaft 22 is not concentric with the axis of the wheel 16. One advantage of this arrangement is that it provides more room for the mounting of the adjustment means for the cutter bar 30. As shown, the flange 51 is supported for pivotal movement about the stud 52 having its outer end threaded into the hole 54. A similar stud 56 extends through an elongated hole 58 in the side frame 12 with its outer end threaded into the hole 59. Set screws 60 located in threaded holes 62 in the flange 51 abut against the side plate 12 upon adjustment to raise or lower the outer end of the bar 30 and to swing the outer end toward and from the reel 24. Bodily adjustment of the bar 30 relative to the reel 24 is accomplished through the adjustment bolt 64 having a pivotal connection with the flange 51 through the pivot stud 66. The stud 64 extends through a collar 68 swiveled on the plate 12. The nuts 70 adjust the stud 64 longitudinally in the collar 68 within the limits of the elongated hole 58 in the plate 12.

As more clearly shown in Fig. II, the off-center arrangement of the reel 22 projects the point of cutting forwardly as compared with the arrangement of my aforesaid application. Also, by raising and lowering the handle bar 48 the height of cut may be varied within a limited range. The reel shaft 22 is supported for rotation by bearings 72 and 74 which are widely spaced, compared with the length of the reel shaft, and are provided at the opposite ends of a hub 76 in which the corresponding end portion of the reel shaft is enclosed, and which hub extends into the space defined by the blades 28. That is to say, the corresponding end portions of the blades overlie the hub 76. This bearing arrangement provides for the rigid supporting of the reel shaft in an efficient and advantageous manner.

Having thus described my invention, what I claim as new and desire to cover by Letters Patent is:

1. In a grass trimmer having a cantilevered cutting reel and cutter bar mounting so arranged and constructed as to provide an open-ended unobstructed zone directly adjacent one end of said reel and bar, said reel comprising a plurality of twisted spiral blades, said blades having the leading ends thereof adjacent said ends of reduced pitch as compared to the remaining pitch of said blades, whereby a hook-like shearing edge is provided for trimming grass directly adjacent the open end of said reel.

2. In a grass trimmer of the type described, a cutting reel supported for rotation around a horizontal axis, a plurality of twisted spiral cutting blades mounted in said reel with the shearing edge portion thereof disposed in a cylindrical surface having a longitudinal axis common to said first axis, said blades extending spirally from one end of said reel to the other, with uniform pitch from the trailing end of said blades to a point adjacent the leading end thereof, said leading end of said blades being of substantially less pitch adjacent an end of said reel.

3. In a grass trimmer, a cutting reel, a cutter bar, means supporting said reel and bar in horizontal parallelism entirely from one side to provide an open-ended cutting reel and cutting bar assembly, cutting blades mounted on said reel with the shearing edge portions thereof disposed in a cylindrical surface, having a longitudinal axis common to that of said reel, said blades being of spiral form with a substantial reduction in pitch adjacent the open end of said reel.

4. A grass trimmer designed to trim the grass directly adjacent a wall or similar obstruction comprising a single wheel carriage having a cutter bar and an open-ended rotatable cutting reel with blades engageable with the cutter bar to trim the grass, the portion of said blades adjacent said outer end of said cutter bar being hook-like to draw the grass inwardly relative to said cutter bar, and means supporting said reel for rotation about an axis parallel to said cutter bar.

5. In an open ended reel type grass trimmer, a cutter bar supported solely from one end in parallelism with the axis of rotating of the reel, fixed structure upon which said bar is supported for swinging movement toward and from the reel, about an axis parallel to the axis of the reel, adjustment means connected between said bar and fixed structure for imparting swing movement to said bar to bodily adjust said bar relative to the reel, and additional adjustment means located between said bar and fixed structure and acting in a direction substantially normal to said first means for swinging the outer end of said bar toward and from the reel and about an axis adjacent the inner end of said bar.

6. In a grass trimmer having a ground wheel, an open ended horizontal reel, a cutter bar, a frame for supporting said wheel upon one side and the reel and bar in parallel relation upon the other side, adjustment structure for the cutter bar comprising means supporting said bar at its inner end for pivoted movement about a horizontal axis, adjustment means between said bar and said frame for bodily swinging said bar around said horizontal axis, and adjustment means between said frame and bar and acting in a direction substantially normal to said first adjustment means to swing said bar about a vertical axis located adjacent the inner end of said bar.

7. A grass trimmer of the type described comprising a frame, a ground wheel mounted upon said frame, a reel shaft mounted upon said frame to extend laterally therefrom and from one side of said ground wheel, a first bearing located adjacent the frame and rotatably supporting the corresponding end of said reel shaft, a second bearing located between the ends of said shaft for rotatably supporting the latter at an intermediate point with respect to its length, whereby said bearings serve to hold the shaft rigid, and a cutting reel mounted upon said shaft for rotation therewith, said cutting reel including cutter blades which at one end extend beyond said second bearing in the direction of said frame and first said bearing.

8. A grass trimmer as claimed in claim 7 wherein the end portion of said reel shaft which extends between said axially spaced bearings is enclosed within a hub supported at one end upon said frame and projecting at its outer end into the space defined by the reel cutter blades.

TRUMAN B. FUNK.

REFERENCES CITED

The following references are of record in the file of this patent:

UNITED STATES PATENTS

| Number | Name | Date |
| --- | --- | --- |
| 881,430 | Merritt | Mar. 10, 1908 |
| 897,436 | Watkins | Sept. 1, 1908 |
| 1,837,725 | Newton | Dec. 22, 1931 |
| 2,318,334 | Rowan | May 4, 1943 |